United States Patent
Cho et al.

(10) Patent No.: US 6,495,980 B2
(45) Date of Patent: Dec. 17, 2002

(54) APPARATUS AND METHOD FOR SENSING LAUNDRY AMOUNT IN A WASHING MACHINE

(75) Inventors: Kwan Yuhl Cho, Seoul (KR); Hak Woon Kim, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/907,711

(22) Filed: Jul. 19, 2001

(65) Prior Publication Data

US 2002/0050011 A1 May 2, 2002

(30) Foreign Application Priority Data

Sep. 28, 2000 (KR) ............................................. 00 57009

(51) Int. Cl.[7] .............................. H02P 7/06; D06F 33/00
(52) U.S. Cl. ...................... 318/254; 318/138; 318/439; 318/432; 68/12.16
(58) Field of Search ................................. 318/138, 254, 318/432, 434, 439, 798–824; 68/12.04, 12.16; 8/159

(56) References Cited

U.S. PATENT DOCUMENTS 5,233,847 A * 8/1993 Tanaka ...................... 68/12.04
6,163,912 A * 12/2000 Matsuura et al. .............. 8/159

* cited by examiner

*Primary Examiner*—Khanh Dang
(74) *Attorney, Agent, or Firm*—Birch, Stewart, Kolasch & Birch, LLP

(57) ABSTRACT

An apparatus for sensing a laundry amount in a washing machine includes: a rectifier; an inverter receiving a DC voltage and converting it to a three-phase AC voltage, a BLDC motor driven by the three-phase AC voltage from the inverter, a rotor position detector detecting the position of a rotor of the BLDC motor; a microcomputer outputting a control signal for controlling a switching operation of the inverter according to the position detect signal of the rotor position detector and a current control signal; a gate driving unit receiving the control signal from the microcomputer and outputting a gate drive signal to the inverter; a torque command generator generating a torque command signal corresponding to a speed set by a user; a torque controller operating the torque command signal from the torque command generator and outputting a q-axis current command signal; a current controller outputting the current control signal according to the q-axis current command signal from the torque controller and a d-axis current command signal; a speed detector detecting a driving speed of the BLDC motor according to the position detect signal of the rotor position detector; a laundry amount sensor comparing the speed detect signal from the speed detector with a previously stored reference speed and sensing a laundry amount; and a current command unit applying the d-axis current command signal to the current controller according to the speed detect signal from the speed detector.

13 Claims, 6 Drawing Sheets

APPARATUS AND METHOD FOR SENSING LAUNDRY AMOUNT IN A WASHING MACHINE

BACKGROUND OF THE INVENTION

1. Field of the Invention

The present invention relates to an apparatus and method for sensing a laundry amount in a washing machine, and more particularly, to an apparatus and method for sensing a laundry amount in a washing machine which is capable of improving the degree of sensing of the laundry amount to heighten an efficiency of a washing machine by controlling a current and detecting a speed to reduce an error of sensing the amount of the laundry caused due to an inconstant common AC power supply especially in an inverter washing machine using a brushless DC (BLDC) motor.

2. Description of the Background Art

Recently, in view of improving a cleaning degree and reducing noise and energy consumption, washing machines mostly adopt an inverter which is able to control the speed of a motor therein. The operations of such a conventional washing machine will now be described with reference to the accompanying drawings.

FIG. 1 is a schematic circuit diagram showing the construction of a general BLDC motor driving apparatus in the conventional art.

As shown in the drawing, the BLDC motor driving apparatus includes a rectifier 10 receiving a common AC power supply voltage and rectifying it to a DC voltage, an inverter 20 receiving the DC voltage from the rectifier 10 through a smoothing capacitor C1 and converting it to a three-phase AC voltage according to gate drive signals from a gate driving unit 60 to be described, a BLDC motor 30 driven by the three-phase AC voltage from the inverter 20, a rotor position detector 40 detecting the position of a rotor of the BLDC motor 30, a microcomputer 50 receiving a position detect signal from the rotor position detector 40 and outputting a control signal according to the position detect signal, and the gate driving unit 60 receiving the control signal from the microcomputer 50 and outputting the gate drive signals to the inverter 20 in response to the control signal.

The operation of the BLDC motor driving apparatus constructed as described above will now be explained.

First, the rectifier 10 rectifies a common AC power supply voltage and outputs the DC voltage. The outputted DC voltage is smoothed by the smoothing capacitor and applied to the inverter 20.

Upon receipt of the DC voltage, the inverter 20 converts it to a three-phase AC voltage and drives the BLDC motor 30 with the three-phase AC voltage according to the gate drive signal from the gate driving unit 60.

At this time, the rotor position detector 40 detects the position of the rotor of the BLDC motor 30 by using a position sensor and applies it to the microcomputer 50.

Upon receipt of the position detect signal from the rotor position detector 40, the microcomputer 50 applies the control signal generated according to the position detect signal, according to which the gate driving unit 60 receives the control signal and applies the gate drive signals to the inverter 20 in response to the control signal.

Thereafter, the operations as described above are repeatedly performed to control driving of the BLDC motor 30.

In order to effectively control a washing/rinsing stroke, an inverter washing machine adopting the BLDC motor which performs the above operations should accurately detect the weight of the laundry, that is, the amount of the laundry.

There are two methods for sensing the amount of the laundry; one is to sense the amount of the laundry in such a manner that the motor is accelerated to a predetermined speed for a certain time period and then the power supply is cut off, during which the deceleration time period, that is, corresponding to the inertia according to the amount of the laundry; and the other is to sense the amount of the laundry by measuring the time taken to accelerate the motor to a certain speed.

Generally, the conventional system in which a pulsator receives a rotational force from a motor via a clutch and a gear or changes a direction adopts the method for sensing the amount of the laundry by measuring the inertia according to the amount of the laundry.

Meanwhile, in the case of a direct drive washing system in which a pulsator or a washing tub is driven by being directly connected with a motor, the time taken to accelerate the motor to a certain speed is measured to sense the amount of the laundry.

As shown in FIGS. 2A through 2E, the motor is initially positioned at a reference point and then the strength of a voltage applied to the motor is regularly increased. This is possible by controlling an inverter switch of the inverter 20 at an appropriate duty ratio as shown in FIG. 2A.

With reference to FIG. 2B which shows the amplitude of a voltage applied to the motor, when the duty ratio is increased, the interval where the inverter is switched on is extended. Thus, it is noted that an average value of the voltage applied to the motor becomes gradually higher as time goes by.

With reference to FIG. 2A, if the amount of the laundry is greater than a reference amount of the laundry, since the motor must develop more torque to reach a certain reference speed or a reference position, a longer time is taken compared to a reference time.

Conversely, if the amount of the laundry is less than the reference amount, the motor needs less energy, and thus, it reaches the reference speed or the reference position within a shorter time than the reference time.

That is, as described above, the amount of the laundry can be detected by computing a time during which the motor or the washing tub reaches a certain speed or a certain position after a certain voltage is applied to the motor.

In this method for sensing the amount of the laundry, factors affecting the accuracy of the sensed amount of the laundry include mechanical factors such as the deflection of a bearing housing, the vibration or imbalance or shaking of a washing tub and the deflection of a damper, motor factors such as the inductance and a rotor position sensing Hall-effect sensor, the factor of a voltage detector, the factor of a voltage variation and the factor of a control circuit vibration due to temperature, etc.

Among those factors, the most influential factor is the voltage detecting error caused due to a variation of the source voltage.

That is, in the case that the amount of the laundry is sensed by the time necessary for reaching a certain reference speed or a certain reference position, a certain source voltage is to be applied regardless of the amount of the laundry or the circumstances. If a certain source voltage is not applied according to the circumstances, the computed value of the amount of the laundry will exhibit a large error from an actual value.

FIGS. 3A through 3E are signal waveforms exhibiting an error in detecting the amount of the laundry in the case that a certain source voltage is not applied to the motor.

As shown in FIGS. 3B and 3D, in the case that, for the same laundry amount, if the source voltage is higher than the reference voltage, if the source voltage applied to the motor in a certain duty ratio is increased, more voltage than the reference voltage would be applied to the motor, so that the motor can reach the reference speed or the reference position earlier than the reference time.

That is, as the motor reaches the reference speed or position earlier than the reference time to by as much as Δt1, a laundry amount sensing error is generated corresponding to the time Δt1. Conversely, in the case that the source voltage is lower than the reference voltage, the motor reaches the reference speed later by as much as Δt2, so that it is detected that there is a greater laundry amount than the actual laundry amount corresponding to the time Δt2.

FIG. 3D shows an AC power source voltage variation and a corresponding variation of a voltage of a DC link terminal in an inverter. The DC link voltage directly affects an average AC voltage applied to the motor through the inverter.

In an effort to solve the laundry amount sensing error caused due to the variation of the source voltage, the DC link voltage is detected to compensate for the voltage applied to the motor.

In this case, however, the DC link voltage should be detected to be compensated on a real time basis, and due to property of the inner elements (the selection of an ideal element can obviate an error in the detected voltage) of the voltage detector or a deviation of a constant voltage regulated power supply for signal processing, there occurs an error in the detected voltage.

SUMMARY OF THE INVENTION

Therefore, an object of the present invention is to provide an apparatus for sensing the laundry amount in a washing machine which is capable of sensing accurately the laundry amount by controlling an applied current and a torque of a motor of the washing machine.

To achieve these and other advantages and in accordance with the purpose of the present invention, as embodied and broadly described herein, there is provided an apparatus for sensing a laundry amount in a washing machine including: an inverter receiving the DC voltage from the rectifier through a smoothing capacitor and converting it to a three-phase AC voltage, a BLDC motor driven by the three-phase AC voltage from the inverter, a rotor position detector detecting the position of a rotor of the BLDC motor; a microcomputer controlling a switching operation of the inverter according to the position detect signal from the rotor position detector; a gate driving unit receiving a control signal from the microcomputer and outputting a gate drive signal to the inverter; a torque command generator generating a torque command signal corresponding to a speed set by a user; a torque controller operating the torque command signal from the torque command generator and outputting a q-axis current command signal; a current controller applying a current control signal according to the q-axis current command signal from the torque controller and a d-axis current command signal from a current command unit to the inverter; a speed detector detecting a driving speed of the BLDC motor according to the position detect signal from the rotor position detector; a laundry amount sensor comparing the speed detect signal from the speed detector with a previously stored reference speed value and determining a laundry amount therefrom; and a current command unit applying the d-axis current command signal to the current controller according to the speed detect signal from the speed detector.

To achieve at least these advantages in whole or in parts, there is further provided a method for sensing a laundry amount in a washing machine including the steps of: receiving a torque command signal, operating it and outputting a q-axis current command signal; receiving the q-axis current command signal and a d-axis current command signal and outputting a corresponding current control signal; applying a three-phase AC voltage to a BLDC motor of the washing machine according to the current control signal and detecting a position of a rotor of the BLDC motor; receiving a position detect signal and detecting a driving speed of the BLDC motor accordingly; receiving the speed detect signal, comparing the speed detect signal with a previously stored reference speed value and sensing a laundry amount therefrom; and receiving the speed detect signal, comparing the speed detect signal with the previously stored reference speed value and outputting a d-axis current command signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
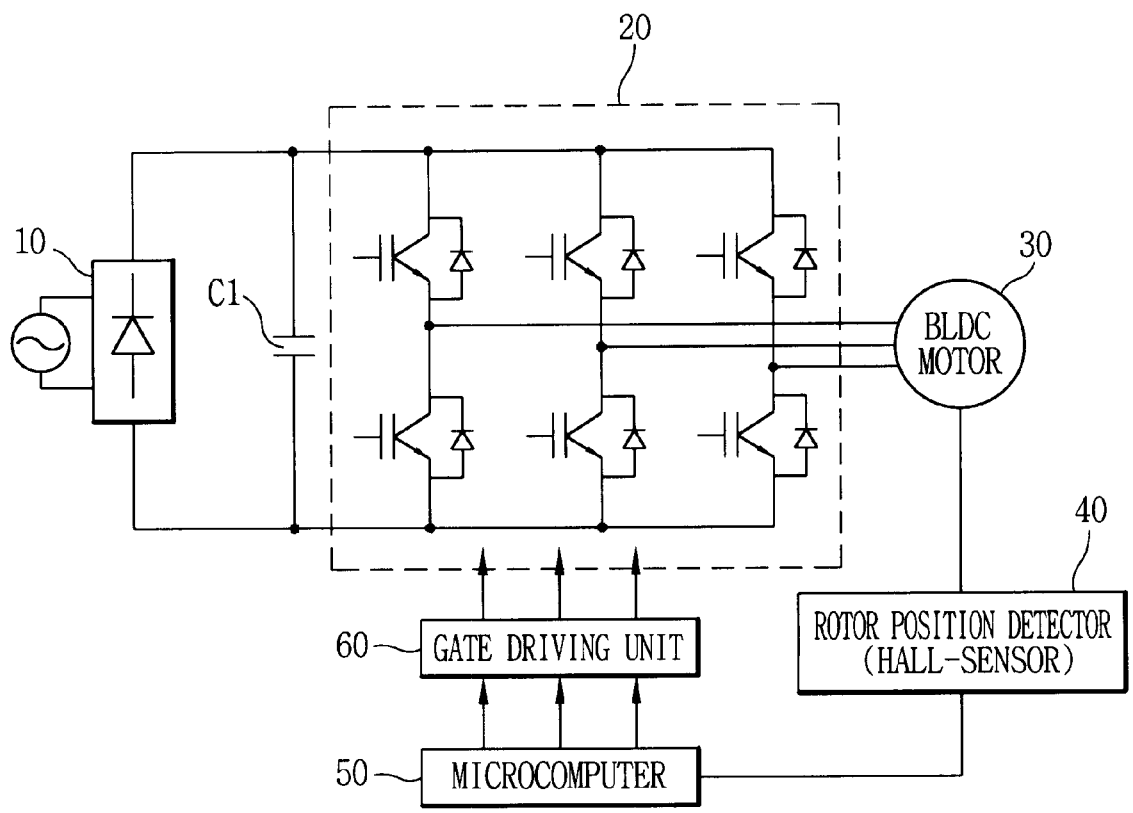
FIG. 1 is a schematic circuit diagram showing the construction of a BLDC motor driving apparatus in the conventional art.
Figure 2A:
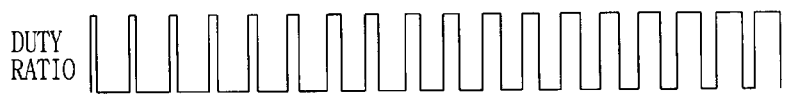
FIG. 2A a drawing illustrating a motor driving voltage waveform duty ratio being increased to detect a laundry amount in the conventional art.
Figure 2B:
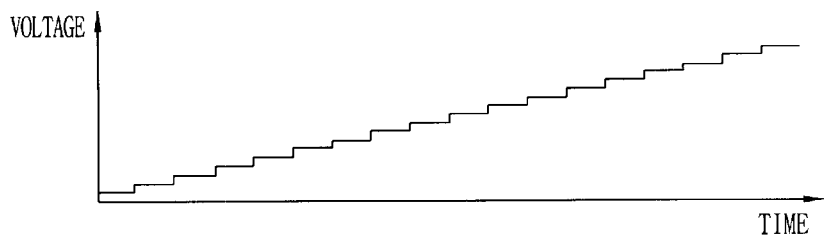
FIG. 2B is a graph showing how a driving voltage applied to the motor is increased over time in the conventional art.
Figure 2C:
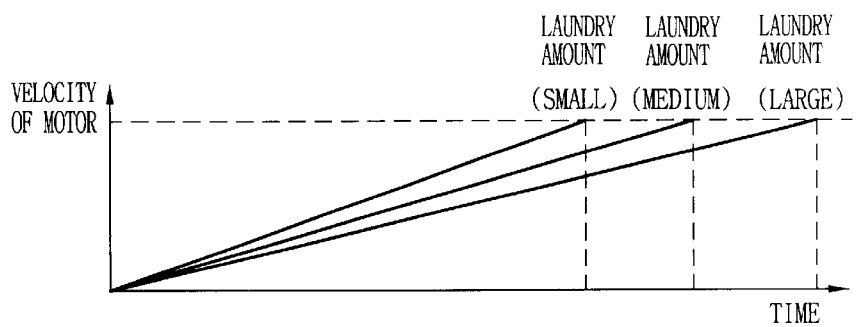
FIG. 2C is a graph showing the time in which the speed of a motor reaches a reference speed according to each laundry amount in the conventional art.
Figure 2D:
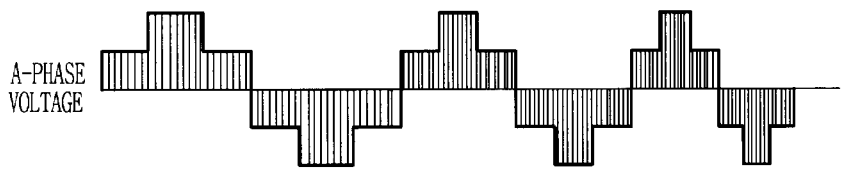
FIG. 2D is a waveform diagram illustrating an 'A'-phase voltage of an inverter and showing how a period becomes shorter gradually through a switching operation of the inverter in the conventional art.
Figure 2E:
FIG. 2E is a waveform diagram showing an 'A'-phase current of the inverter in the conventional art.
Figure 3A:
FIG. 3A is a waveform diagram showing the change in duty ratio according to ON/OFF operation of a gate drive signal in the inverter in the conventional art.
Figure 3B:
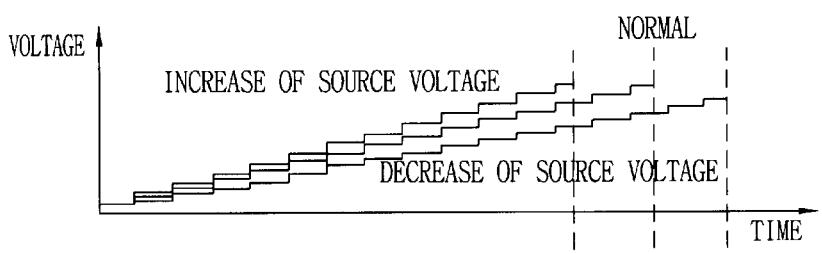
FIGS. 3B and 3C are graphs showing how an average voltage is applied to the motor and how the speed of the motor reach the reference speed at a different time according to a change in the supply voltage in the conventional art.
Figure 3C:
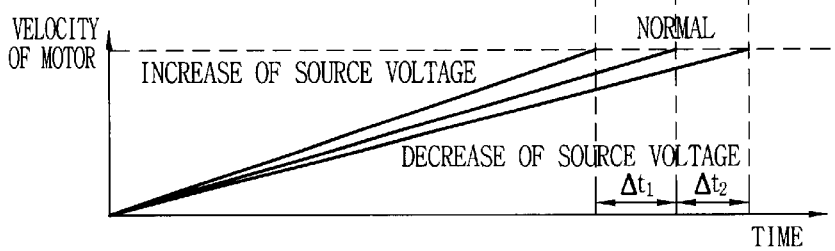
Figure 3D:
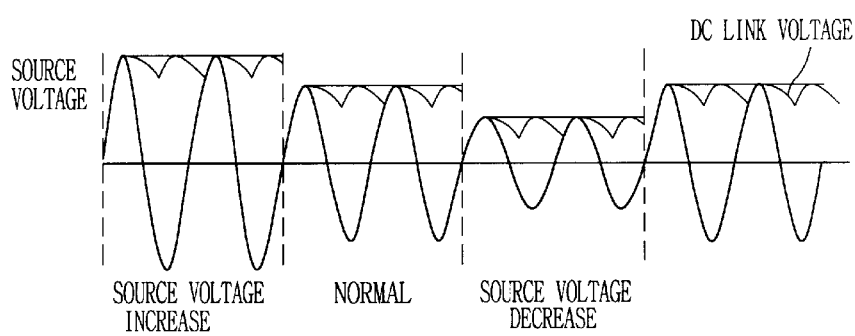
FIG. 3D is a waveform diagram showing the change in a supply voltage and the corresponding change in the voltage of a DC link terminal of an inverter in the conventional art.
Figure 4:
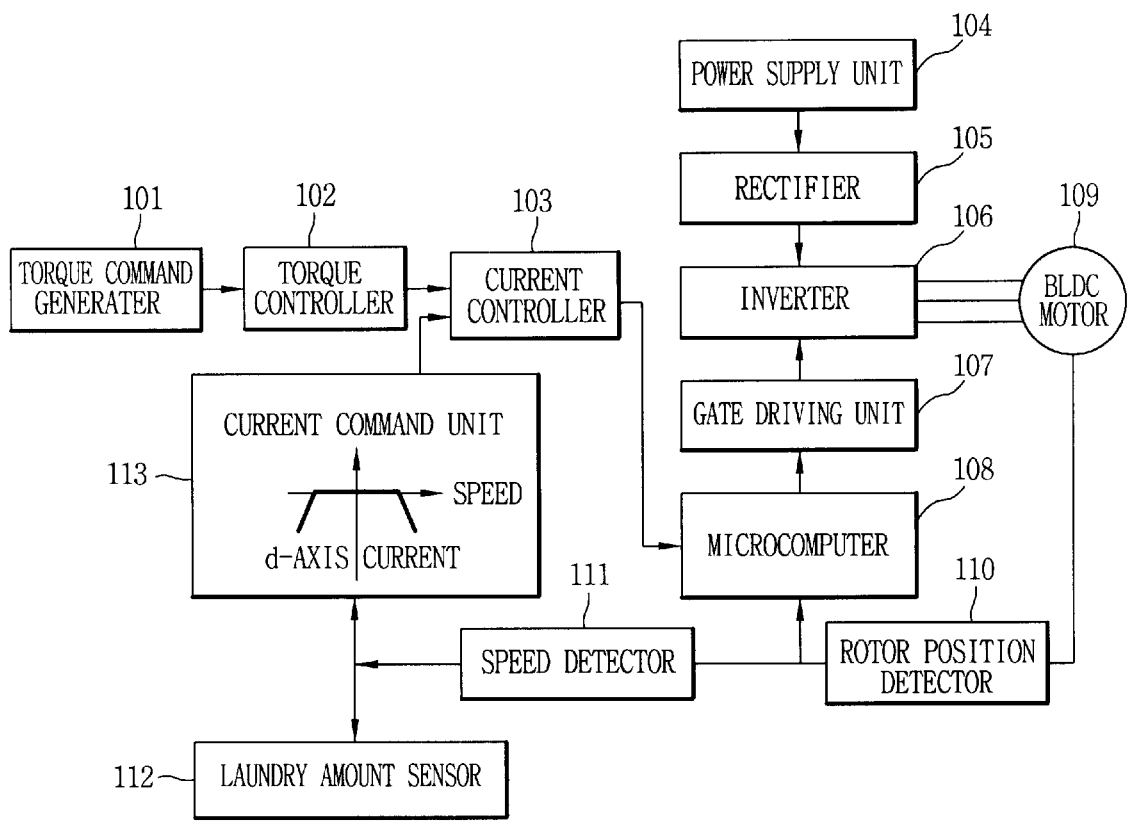
FIG. 4 is a schematic block diagram showing the construction of an apparatus for sensing a laundry amount in a washing machine in accordance with a preferred embodiment of the present invention.

FIG. 4 is a schematic block diagram showing the construction of an apparatus for sensing a laundry amount in a washing machine in accordance with a preferred embodiment of the present invention.

As shown in FIG. 4, the apparatus for sensing a laundry amount in a washing machine includes a torque command generator 101 generating a torque command signal according to a user's manipulation of a button(e.g. a made selection button); a torque controller 102 receiving the torque command signal from the torque command generator 101, operating it and outputting a q-axis current command signal, a current controller 103 receiving the q-axis current command signal from the torque controller 102 and a d-axis current command signal from a current command unit 113 and outputting a current control signal; a power supply unit 104 applying a common AC power supply voltage to a rectifier 105; the rectifier 105 receiving the common AC power supply voltage from the power supply unit 104 and rectifying it to a DC voltage, an inverter 106 converting the DC voltage from the rectifier 105 into a three-phase AC voltage according to a gate drive signal from a gate drive unit 107 and applying the three-phase AC voltage to a BLDC motor 109, a rotor position detector 110 detecting a position of a rotor of the BLDC motor 109, a microcomputer 108 receiving a position detect signal from the rotor position detector 110 and the current control signal from the current controller 103 and outputting a control signal, the gate drive unit 107 receiving the control signal from the microcomputer 109 and outputting the gate drive signal to the inverter 106, a speed detector 111 receiving the position detect signal from the rotor position detector 110 and detecting therefrom a driving speed of the BLDC motor 109, a laundry amount sensor 112 receiving a speed detect signal from the speed detector 111, comparing it with a previously stored reference speed and sensing a laundry amount accordingly, and the current command unit 113 receiving the speed detect signal from the speed detector 111, comparing it with a previously stored reference speed and applying a d-axis current command signal to the current controller 103.

The operation of the apparatus for sensing the laundry amount in a washing machine constructed as described above will now be explained.

First, a model formula of the BLDC motor in use for a general inverter was washing machine is expressed by equation 1 shown below.

$$v_{abcs} = r_s i_{abcs} + \frac{d}{dt} L_s i_{abcs} + e_{abcs} \qquad (1)$$

wherein $$r_s = \begin{bmatrix} r_s & 0 & 0 \\ 0 & r_s & 0 \\ 0 & 0 & r_s \end{bmatrix},$$

$$L_s = \begin{bmatrix} L_{ls} + \frac{3}{2}L_A & 0 & 0 \\ 0 & L_{ls} + \frac{3}{2}L_A & 0 \\ 0 & 0 & L_{ls} + \frac{3}{2}L_A \end{bmatrix},$$

$$e_{abcs} = \omega_r \Phi_f \begin{bmatrix} \cos\theta_r \\ \cos\left(\theta_r - \frac{2}{3}\pi\right) \\ \cos\left(\theta_r + \frac{2}{3}\pi\right) \end{bmatrix}$$

In the above formula, the A phase voltage and the phase current are cosine waveforms, and the B phase voltage and current are cosine waves delayed 120° in electrical angle, respectively. The C phase voltage and current are cosine waves delayed 240° in electrical angle.

In order to facilitate interpretation of the phase voltage and the phase current for the phases 'A', 'B' and 'C', conversion formulas by which the axes of the 'A', 'B' and 'C' phases are transformed into a 'd' axis and a 'q' axis to eliminate a variable are expressed below.

$$f_{qdos} = K(\theta_r) f_{abcs} \qquad (2)$$

$$f_{qdos} = [f_{qs} f_{ds} f_{os}]^T \qquad (2\text{-}1)$$

$$f_{abcs} = [f_{as} f_{bs} f_{cs}]^T \qquad (2\text{-}2)$$

wherein $$K(\theta_r) = \frac{2}{3} \begin{bmatrix} \cos\theta_r & \cos\left(\theta_r - \frac{2}{3}\pi\right) & \cos\left(\theta_r + \frac{2}{3}\pi\right) \\ \sin\theta_r & \sin\left(\theta_r - \frac{2}{3}\pi\right) & \sin\left(\theta_r + \frac{2}{3}\pi\right) \\ \frac{1}{2} & \frac{1}{2} & \frac{1}{2} \end{bmatrix},$$

$$\theta_r = \int_0^t \omega(\zeta) d\zeta + \theta(0)$$

In the case where equation (2) is adopted to transform the axes of the 'A', 'B' and 'C' phases into the 'd' and 'q' axes, the following equations are obtained.

$$v_{qs} = r_s i_{qs} + L_q \frac{d}{dt} i_{qs} + \omega_r L_d i_{ds} + k_e \omega_r \qquad (3\text{-}1)$$

$$v_{ds} = r_s i_{ds} + L_d \frac{d}{dt} i_{ds} - \omega_r L_q i_{qs} \qquad (3\text{-}2)$$

Accordingly, when the three variables of the 'A', 'B' and 'C' phases in equation (1) are converted into the 'd' and 'q' axes, they are reduced to the two variables as shown in equations (3-1) and (3-2). In addition, the voltage and the current in equation (1) are represented as sine waves, but the voltage and the current of the axes of 'd' and 'q' in equation (3) are represented only by the magnitude of the DC value in the normal operation.

At this time, the torque of the motor represented as the 'd' and 'q' axes is expressed in the following equation (4).

$$T_e = \frac{3}{2} \frac{p}{2} [\Phi_f i_{qs} + (L_d - L_q) i_{ds} i_{qs}] \quad (4)$$

where, 'P' indicates the number of poles of the motor, $\Phi_f$ indicates the strength of the magnetic flux of a permanent magnet, $L_d$ indicates the d-axis inductance, and $L_q$ indicates the q-axis inductance.

In the case of a permanent magnet-buried BLDC motor wherein a permanent magnet is inserted into a rotor core, since $L_d$ is smaller than $L_q$, the reluctance torque generated due to the inductance difference may be utilized. However, in the case of a BLDC motor wherein a permanent magnet is attached on the surface of the rotor core, since $L_d$ and $L_q$ are the same, equation (4) may be expressed by the following equation (5).

$$T_e = \frac{3}{2} \frac{P}{2} \Phi_f i_{qs} = k_t i_{qs} \quad (5)$$

$$J \frac{dw_m}{dt} + Bw_m + T_L$$

Where $w_m$ is the mechanical speed and is given as (2/p) $w_r$

That is, with reference to equation (5), the torque developed by the motor is proportional to the q-axis current, and the mechanical torque of the motor includes a torque component according to the inertia, a frictional force component in proportion to the speed, and a constant load component regardless of the speed.

Accordingly, after clothes are put in a washing tub, when the washing tub or a pulsator is driven, the initial moment (J) and a certain load ($T_L$) are varied in a mechanical torque equation of the motor. Therefore, when a certain torque is applied, the time required to reach a certain speed is varied according to the laundry amount.

The torque is developed in proportion to the current. Thus, if the q-axis Is current is constantly controlled, a constant torque would be generated by the motor, according to which the time taken to reach a certain speed according to the laundry amount can be detected to thereby sense the laundry amount. The present invention is based on this concept, which will now be described with reference to FIG. 4.

First, the torque command generator 101 generates a torque command signal corresponding to a speed(e.g. operating mode) set by the user. The torque controller 102 receives the torque command signal from the torque generator 100, operates it and outputs a q-axis current command signal.

At this time, the current controller 103 receives the q-axis current command signal from the torque controller 102 and the d-axis current command signal from the current command unit 113 and outputs a current control signal.

In this respect, with reference to FIG. 6, if the DC link voltage increases, the current controller 103 via the microcomputer 108 and gate drive unit 107 controls the gate drive signal to lower the duty ratio of the voltage applied to the BLDC motor 109, to control the current. If, however, the DC link voltage decreases, the current controller 103 via the microcomputer 108 and gate drive unit 107 controls the gate drive signal to increase the duty ratio of the voltage applied to the BLDC motor 109, to control the current. Namely, even though the DC link voltage is varied, the amount of variation is automatically compensated and thus a torque of the motor doesn't have an effect on the error(in accordance with the variation of the DC link voltage).

Figure 5A:
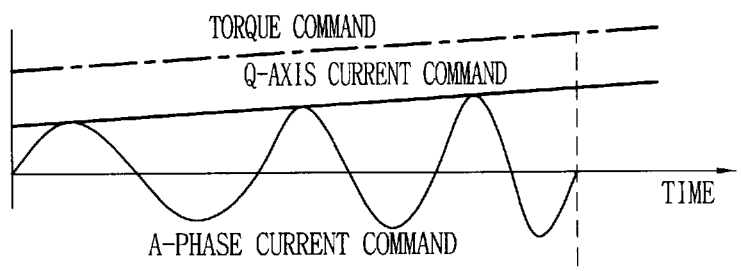
FIGS. 5A and 5B show waveforms of a q-axis current command and a phase current command according to the motor speed in the apparatus of FIG. 4 in accordance with the preferred embodiment of the present invention.
Figure 5B:
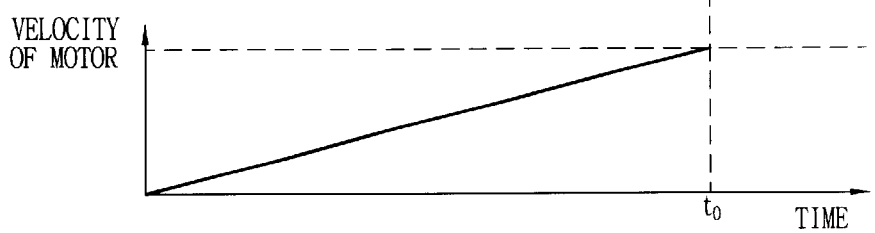
Figure 5C:
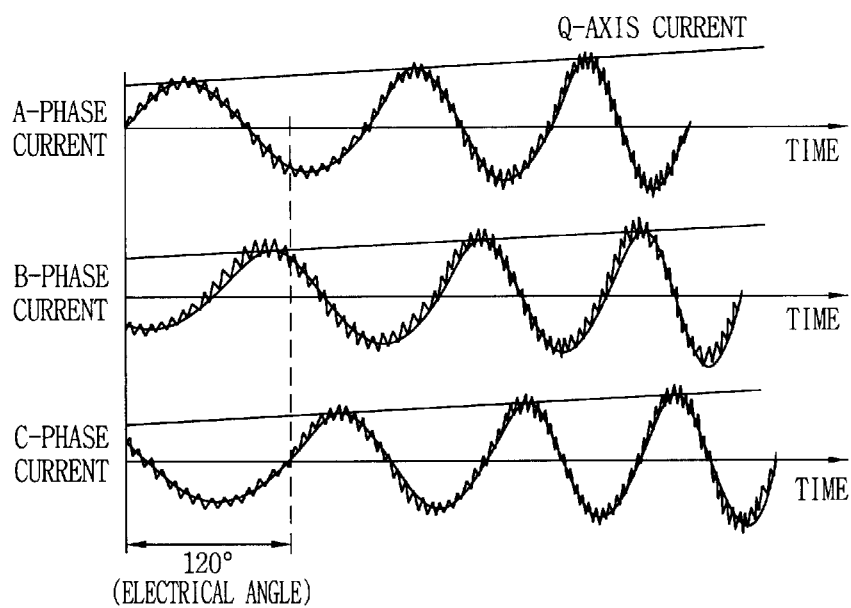
FIG. 5C shows signal waveforms of a q-axis current according to each phase and each of the actual phase currents in accordance with the preferred embodiment of the present invention.

As aforementioned, the current controller 103 directly controls the q-axis current command and the d-axis current command. Or, as shown in FIGS. 5A and 5C, the q-axis current command the d-axis current command are converted into the phase currents of 'A', 'B' and 'C', so as to be controlled.

Thereafter, the microcomputer 108 receives the current control signal from the current controller 103 and applies the control signal to the gate drive unit 107. Accordingly, the gate drive unit 107 receives the control signal from the microcomputer 108 and applies the gate drive signal to the inverter 106.

Thereafter, the inverter 106 converts the DC voltage rectified by the rectifier 105 into a three-phase AC voltage and applies it to the BLDC motor 109, to thereby drive the BLDC motor.

The rotor position detector 110 detects the position of the rotor of the BLDC motor 109 and applies the rotor position detect signal to the microcomputer 108, according to which the microcomputer 108 controls gate drive unit 107 which applies gate drive signal to the inverter 106.

That is, switching of the inverter 106 is controlled depending on the position of the rotor detected by the rotor position detector 110 and the current control signal from the current controller 103.

Figure 6A:
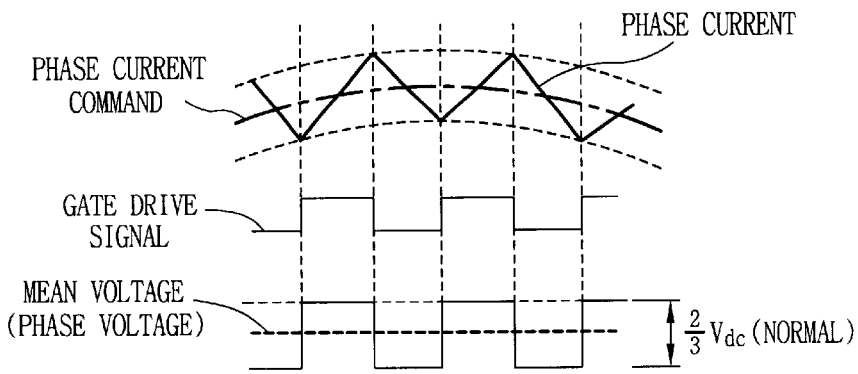
FIGS. 6A, 6B and 6C are waveform diagrams of gate drive signals to control a current according to the change of the supply voltage in the apparatus of FIG. 4 in accordance with the preferred embodiment of the present invention.
Figure 6B:
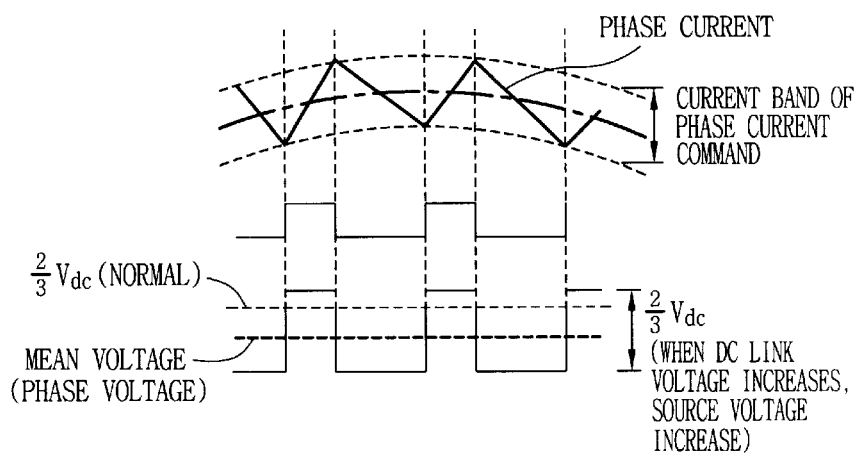
Figure 6C:
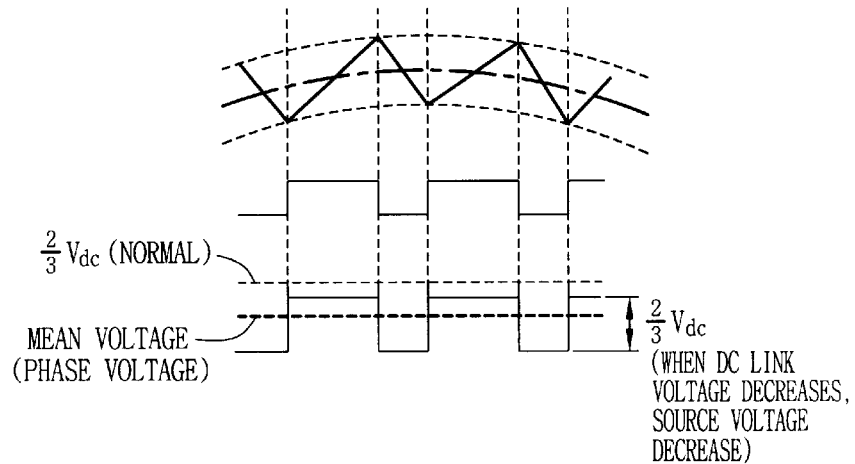

FIGS. 6A, 6B and 6C are waveforms of gate drive signals applied to the inverter 106 to control the current according to the change of DC link voltage in the apparatus of FIG. 4 in accordance with the preferred embodiment of the present invention.

In detail, FIG. 6A illustrates a phase current command, a gate drive signal and a corresponding phase voltage when the supply voltage is normally supplied, and FIGS. 6B and 6C illustrate a phase current command, a gate drive signal and a corresponding phase voltage when the supply voltage is higher than the normal value and lower than the normal value, respectively.

The speed detector 111 receives the position detect signal from the rotor position detector 110 and detects the driving speed of the BLDC motor 109.

Then, the laundry amount sensor 112 receives the speed detect signal from the speed detector 111 and compares it with the previously stored reference speed to sense the laundry amount.

The laundry amount sensor 112 includes a ROM(Read Only Memory) in which are stored an experimental values of laundry amounts corresponding to times taken for reaching the reference speed. Thus, the laundry amount sensor 112 computes the time during which the speed detect signal detected by the speed detector 111 reaches the reference speed, to sense the laundry amount.

The current command unit 113 receives the speed detect signal from the speed detect unit 111, compares it with the previously stored reference speed value and applies the appropriate d-axis current command signal to the current controller 103.

The current command unit 113 includes a ROM which stores experimental values of current command signals corresponding to values of the speed detect signal. Thus, if the speed value detect signal from the speed detector unit 111 is lower than a rated speed, the current command unit 113 generates the d-axis current command signal as '0'. If, however, the speed values of the detect signal from the speed detect unit 111 exceeds the rated speed, the current command unit 113 outputs the pre-set d-axis current command signal from the ROM.

As so far described, The apparatus and method for sensing the laundry amount in a washing machine according to the present invention has the advantage that the sensing operation of the laundry amount is improved by controlling the current while detecting the speed of the motor, and thus, the accuracy of sensing and thus the efficiency of the washing machine can be heightened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for sensing a laundry amount in a washing machine, comprising: an inverter for receiving a DC voltage and converting it to a three-phase AC voltage;
   a BLDC motor driven by the three-phase AC voltage from the inverter;
   a rotor position detector for detecting the position of a rotor of the BLDC motor and outputting a position detect signal in accordance therewith;
   a microcomputer for outputting a control signal for controlling a switching operation of the inverter according to the position detect signal from the rotor position detector and a current control signal;
   a gate driving unit receiving the control signal from the microcomputer and outputting a gate drive signal to the inverter in accordance therewith;
   a torque command generator generating a torque command signal corresponding to a speed set by a user;
   a torque controller operating the torque command signal from the torque command generator and outputting a q-axis current command signal in accordance therewith;
   a current controller applying the current control signal to the inverter according to the q-axis current command signal from the torque controller and a d-axis current command signal;
   a speed detector detecting a driving speed of the BLDC motor according to the position detect signal from the rotor position detector and outputting a speed detect signal in accordance therewith;
   a laundry amount sensor comparing the speed detect signal from the speed detector with a previously stored reference speed value and sensing therefrom a laundry amount; and
   a current command unit applying the d-axis current command signal to the current controller according to the speed detect signal from the speed detector.

2. The apparatus of claim 1, wherein the laundry amount sensor includes a ROM which stores an experimental values of laundry amounts corresponding to times taken for during which the speed detect signal from the speed detector to reach a reference speed.

3. The apparatus of claim 1, wherein the current command unit includes a ROM which stores experimental values of current command signals corresponding to values of the speed detect signal.

4. The apparatus of claim 1, wherein, if a DC link supply voltage to the inverter increases, the microcomputer and gate driving unit adjusts the gate drive signal to lower a duty ratio of the three-phase AC voltage applied to the motor, to thereby control a driving current of the motor, and if the DC link voltage decreases, the microcomputer and gate driving unit adjusts the gate drive signal to increase the duty ratio of the three-phase AC voltage applied to the motor, to thereby control the driving current of the motor.

5. The apparatus of claim 1, wherein if a value of the speed detect signal is lower than a rated speed value, the current command unit generates the d-axis current command signal as '0', and if the value of the speed detect signal exceeds the rated speed value, the current command outputs a pre-set d-axis current command signal.

6. The apparatus of claim 1, wherein the current controller varies a current applied to the motor according to a load torque or a torque command, or outputs a d-axis current command signal of a certain value.

7. The apparatus of claim 3, wherein if a value of the speed detect signal is lower than a rated speed value, the current command unit generates the d-axis current command signal as '0', and if the value of the speed detect signal exceeds the rated speed value, the current command outputs a pre-set d-axis current command signal.

8. The apparatus of claim 3, wherein the current controller varies a current applied to the motor according to a load torque or a torque command, or outputs a d-axis current command signal of a certain value.

9. A method for sensing a laundry amount in a washing machine comprising the steps of:
   receiving a torque command signal, operating it and outputting a q-axis current command signal;
   receiving the q-axis current command signal and a d-axis current command signal and outputting a corresponding current control signal;
   controlling inverter switches according to a microcomputer and a gate driving unit which receives signal outputted from current controller and rotor position detector;
   applying a three-phase AC voltage to a BLDC motor of the washing machine according to the current control signal and detecting a position of the rotor of the BLDC motor;
   receiving a position detect signal and detecting a driving speed of the BLDC motor;
   receiving a speed detect signal, comparing the speed detect signal with a previously stored reference speed and sensing a laundry amount therefrom; and
   receiving the speed detect signal, comparing the speed detect signal with the previously stored reference speed and outputting the d-axis current command signal.

10. The method of claim 9, wherein the step of receiving the torque command signal, operating it and outputting the q-axis current command signal, comprises: setting a reference position command or a speed command, computing a torque command value corresponding to the set command and computing a q-axis current command signal corresponding to the computed torque command value.

11. The method of claim 9, wherein the step of applying a three-phase AC voltage to the BLDC motor according to the current control signal and detecting the position of the rotor of the BLDC motor, comprises:

a step in which a rotor position detector detects the position of the rotor of the BLDC motor, and a microcomputer receives the detected position of the rotor and generates a control signal to control switching of an inverter.

12. The method of claim 9, wherein the step of receiving the position detect signal and detecting the driving speed of the BLDC motor, comprises:

storing in a ROM experimental values of laundry amounts corresponding to times taken for during which the speed detect signals reach the reference speed, computing the time period taken for the speed detect signal to reach the reference speed, reading from the ROM a value corresponding to the computed time period and sensing therefrom the value as the laundry amount.

13. The method of claim 9, wherein the step of receiving the speed detect signal, comparing the speed detect signal with the previously stored reference speed and outputting the d-axis current command signal, comprises:

generating the d-axis current command signal as '0' if the speed detect signal is lower than a rated speed value, or outputting a pre-set d-axis current command signal if the speed detect signal exceeds the rated speed value, for thereby varying the current applied to the motor according to a load torque or a is laundry amount or outputting a certain value of d-axis current command signal.

* * * * *